United States Patent [19]
Kizu

[11] Patent Number: 5,621,536
[45] Date of Patent: Apr. 15, 1997

[54] APPARATUS THAT AUTOMATICALLY SETS KEY FRAME INFORMATION

[75] Inventor: Sojiro Kizu, Kanagawa, Japan

[73] Assignee: Sony Corporation, Tokyo, Japan

[21] Appl. No.: 259,119

[22] Filed: Jun. 10, 1994

Related U.S. Application Data

[63] Continuation of Ser. No. 980,588, Nov. 23, 1992, abandoned.

[30] Foreign Application Priority Data

Nov. 25, 1991 [JP] Japan ................................. 3-309102

[51] Int. Cl.$^6$ ........................... H04N 9/79; G11B 27/02
[52] U.S. Cl. ................................. 386/52; 386/126
[58] Field of Search ................................. 358/311, 357, 358/452, 335; 360/13, 14.1, 14.2, 14.3, 32, 33.1

[56] References Cited

U.S. PATENT DOCUMENTS

| | | | |
|---|---|---|---|
| 4,199,788 | 4/1980 | Tsujimura | 358/183 |
| 4,507,691 | 3/1985 | Ishiguro et al. | 360/14.3 |
| 4,901,166 | 2/1990 | Kojima | 360/14.1 |
| 5,063,470 | 11/1991 | Fukuzawa et al. | 360/137 |

*Primary Examiner*—Thai Q. Tran
*Assistant Examiner*—Robert Chevalier
*Attorney, Agent, or Firm*—Jay H. Maioli

[57] ABSTRACT

An editing apparatus for editing a video signal comprises a unit for reproducing a video signal and time code data recorded on a recording medium, a first control unit for controlling an operation of the reproducing device, a first setting unit for setting an in-point address and an out-point address, a unit for reading first and second time code data obtained from the reproducing unit corresponding to the in-point address and the out-point address, respectively, a first memorizing unit for memorizing the first and second time code data, a unit for producing a difference between the first and second time code data a second memorizing unit for memorizing the difference obtained from the producing unit, a second setting unit for automatically setting a time or speed information of key frame on the basis of the difference, a unit for processing the video signal provided from the reproducing unit to achieve a visual effect, and a second control unit for controlling an operation of the processing unit on the basis of the time or speed information of the key frame.

8 Claims, 3 Drawing Sheets

APPARATUS THAT AUTOMATICALLY SETS KEY FRAME INFORMATION

This is a continuation of application Ser. No. 07/980,588, filed Nov. 23, 1992, now abandoned.

BACKGROUND OF THE INVENTION

1. Field of the Invention

The present invention relates to an editing apparatus for use with an editing system or the like that processes a desired picture from an optical disc reproducing apparatus, a hard disc reproducing apparatus, a reproducing apparatus using an image memory that can output a real moving image, a video tape recorder (VTR) or the like to achieve a special visual effect, for example.

2. Description of the Related Art

Conventional editing systems comprise a video reproducing apparatus such as a VTR, a variety of disc reproducing apparatus or the like, a digital multi-effector serving as a special visual effect apparatus and a controller serving as an editing machine for controlling the foregoing apparatus or reading a time code from a video tape reproduced by the VTR or the like and displaying the same.

The VTR supplies video data, provided as a video material, to the digital multi-effector under the control of the controller. The digital multi-effector processes the video data supplied thereto to achieve a special visual effect such as wipe, fade or the like. U.S. Pat. No. 4,199,788 describes such special visual effect apparatus which processes video data to achieve a special visual effect. As typical and fundamental visual effects achieved by this kind of special visual effect apparatus, a small picture displayed on the display screen of the monitor receiver is moved while it is being enlarged progressively on the display screen of the monitor receiver and then changed to other picture than the original picture at the position to which the above small picture is moved.

A picture is displayed according to the above special visual effect apparatus as follows:

Initially, pictures of video signals are reproduced from video tapes, for example, by two VTRs. Then, the picture of the video signal from the first VTR is moved on the display screen of the monitor receiver and changed into the picture of video signal from the second VTR at the position where the first picture is moved. Further, this picture is moved. How to achieve a special visual effect will be described in association with the above example.

When the first VTR is activated by the controller, a video signal reproduced from the video tape by the first VTR is supplied to and displayed on the display screen of the monitor receiver. While the above operation is being effected, time code data is read out from the video tape, reproduced by the VTR, by the controller and the time code data thus read is displayed on a display section of the controller. Then, when the operator visually confirms a picture displayed on the display screen of the monitor receiver and discovers a desired picture that should be utilized in the special visual effect processing, the time code data displayed on the display section of the controller, i.e., so-called in-point address is noted on a memo paper or the like, for example. Similarly, when the operator visually confirms the picture displayed on the display screen of the monitor receiver and discovers the end of the desired picture that should be used in the special visual effect processing, the time code data displayed on the display section of the controller, i.e., so-called out-point address is noted on a memo paper or the like, for example. At that time, the time code data of the in-point address and out-point address are stored in memory units of the controller, respectively. Then, the operator subtracts the time code signal of the out-point address from the time code signal of the in-point address and a time provided by this subtraction is determined as a time of picture that should be used as a video material. The operator inputs the above time into the digital multi-effector and the digital multi-effector determines the input time information as a first key frame time, for example. The key frame is a function to generate time information by the interpolation or automatic interpolation of data between certain two states in the special visual effect such as move, wipe, fade of graphic pattern or the like.

Then, in a like manner, a desired video signal is selected from video signals recorded on the video tape installed on the second VTR, During selection, time information is calculated on the basis of time code data of the displayed in-point address and out-point address. The time information thus obtained is input to the digital multi-effector. The digital multi-effector determines the input time information as a time of second key frame, for example. Then, the operator depresses a button such as an editing button or the like in the controller.

The controller effects a so-called cue-up control on respective VTRs. Also, the controller reads out time code data from these VTRs to thereby control the respective VTRs to be disabled before 3 to 4 seconds, for example, of the in-point address that was already stored therein.

The duration of 3 to 4 seconds is what might be called a preroll time. This preroll time is served as a preparation time required until the playback servo of the respective VTRs is locked and stabilized by a reference synchronizing signal from the controller, i.e., until the respective VTRs become able to perform the stable reproduction on the time base of the controller.

Thereafter, when the special visual effect processing is started, the video tape of the first VTR is reproduced from the position 3 to 4 seconds before the in-point address. When the in-point address is then reproduced, the video signal from the in-point address to the out-point address is supplied to the digital multi-effector.

An image of a designated video signal from the first VTR designated by the first key frame is displayed on the display screen of the monitor receiver and the image as a real moving picture is moved on the display screen of the monitor receiver during the above input time.

Then, the tape on the second VTR is reproduced from the position 3 to 4 seconds before the in-point address.

At that time, the controller controls the phases of the respective VTRs by the control signal on the basis of time information of an internal timer thereof and the time codes from the respective VTRs, whereby the respective VTRs are driven in synchronism with the controller.

When the reproduction of the tape on the second VTR reaches the in-point address, the video signal from the in-point address to the out-point address is supplied to the digital multi-effector instead of the reproduced video signal from the first VTR.

Consequently, on the display screen of the monitor receiver, the picture of the video signal from the first VTR is switched to a picture (real moving picture) of the video signal from the second VTR and this picture is moved on the display screen of the monitor receiver during the above input time.

As described above, according to the prior art, when the input video signal is processed to achieve a special visual effect, the time code data of the in-point address and out-point address are noted on the memo paper or the like and a time difference between the in-point address and the out-point address is calculated on the basis of the time code data of the in-point address and the time code data of the out-point address in a manual fashion. Then, a time information representative of the calculated time difference is input to the digital multi-effector in a manual fashion. A series of above operation becomes cumbersome for the operator. Moreover, if the input time is set to be shorter than the actual time between the in-point address and the out-point address due to inadvertent processing such as a mistake in calculation or the like, for example, then extra lines are displayed in the picture that was processed to achieve the special visual effect. Conversely, if the input time is set to be longer than the actual time between the in-point address and the out-point address, then a special visual effect processing is finished in the picture that was processed to achieve the special visual effect before the designated picture is fully displayed.

OBJECTS AND SUMMARY OF THE INVENTION

Therefore, it is an object of the present invention to provide an improved editing apparatus in which the aforesaid shortcomings and disadvantages encountered with the prior art can be eliminated.

Another object of the present invention is to provide an editing apparatus which relieves the operator from the cumbersome work of calculating a key frame time or speed and entering the calculated result into a special visual effect apparatus.

Still another object of the present invention is to provide an editing apparatus which is easy to handle.

A further object of the present invention is to provide an editing apparatus which minimizes the occurrence of a mistake by the operator such as a mistake in calculation or the like.

Yet a further object of the present invention is to provide an editing apparatus which facilitates editing work of high accuracy.

According to an aspect of the present invention, there is provided an editing apparatus for editing a video signal which comprises a unit for reproducing a video signal and time code data recorded on a recording medium, a first control unit for controlling an operation of the reproducing device, a first setting unit for setting an in-point address and an out-point address, a unit for reading first and second time code data obtained from the reproducing unit corresponding to the in-point address and the out-point address, respectively, a first memorizing unit for memorizing the first and second time code data, a unit for producing a difference between the first and second time code data, a second memorizing unit for memorizing the difference obtained from the producing unit, a second setting unit for automatically setting time or speed information of key frame on the basis of the difference, a unit for processing the video signal provided from the reproducing unit to achieve a visual effect, and a second control unit for controlling an operation of the processing unit on the basis of the time or speed information of the key frame.

BRIEF DESCRIPTION OF THE DRAWINGS

A better understanding of other objects, features, and advantages of the present invention can be gained from a consideration of the following detailed description of an illustrative embodiment thereof, in conjunction with the accompanying drawings, in which.

DETAILED DESCRIPTION OF THE PREFERRED EMBODIMENT

Figure 1:
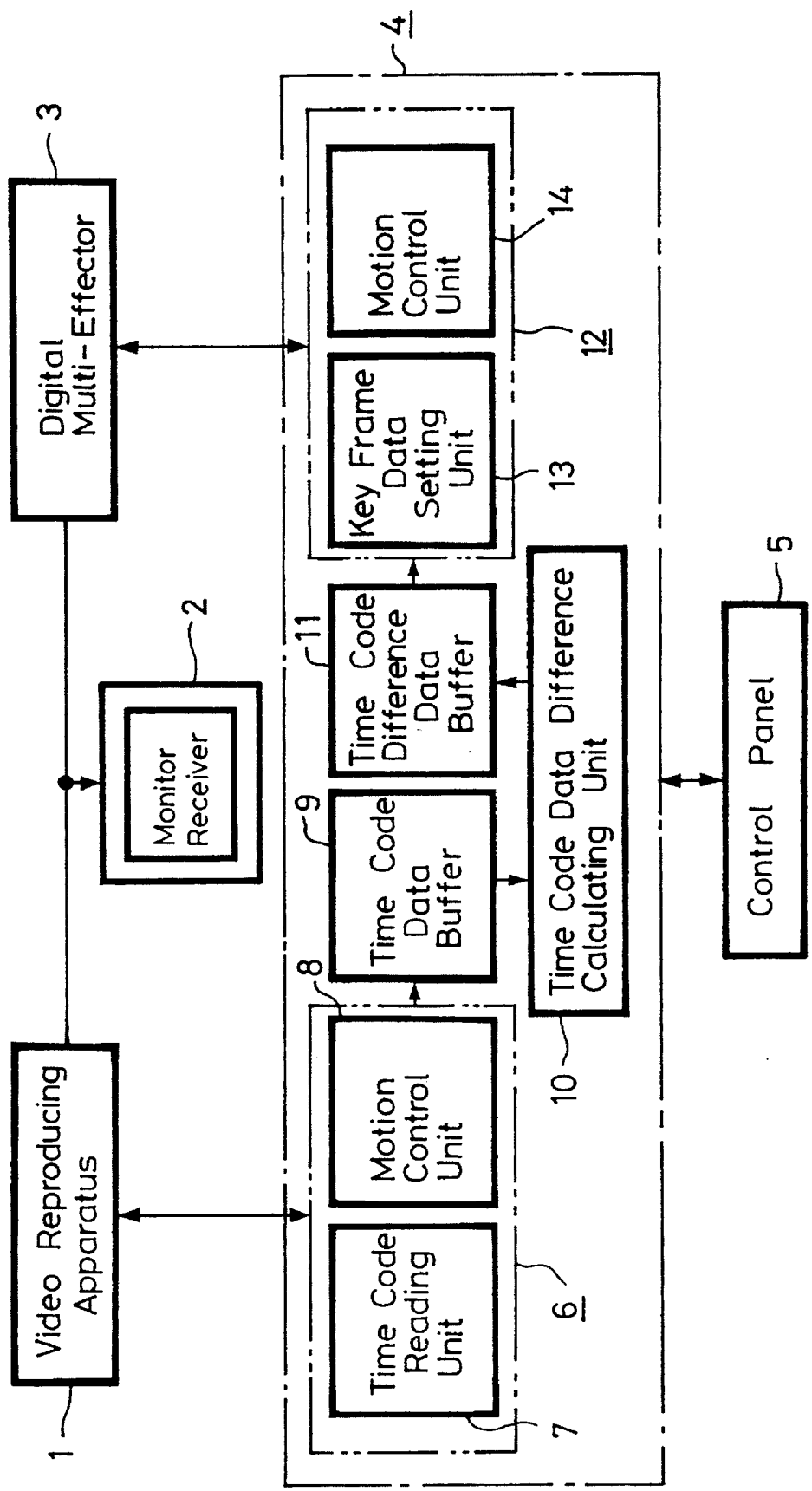
FIG. 1 is a block diagram showing an editing apparatus according to an embodiment of the present invention.

Referring to the drawings in detail, and initially to FIG. 1, an editing apparatus according to an embodiment of the present invention will hereinafter be described in detail.

As shown in FIG. 1 of the accompanying drawings, there is provided a video reproducing apparatus 1 such as an image reproducing apparatus that employs a hard disc, an optical disc and an image memory capable of producing a moving picture as a recording medium and a video reproducing apparatus such as a VTR or the like. A reproduced video signal and time code data from the video reproducing apparatus 1 are supplied to a control unit 6 constructing a controller 4.

The control unit 6 comprises a time code reading unit 7 and a motion control unit 8. The time code reading unit 7 reads the time code data from the video reproducing apparatus 1 and supplies the time code data thus read-out to a time code data buffer 9.

The motion control unit 8 supplies the video reproducing apparatus 1 with a control signal that is generated in accordance with operation of a control panel 5. The motion control unit 8 controls operation such as playback operation or the like by the control signal. If the VTR or the like is used as the video reproducing apparatus 1, then the motion control unit 8 supplies a reference synchronizing signal to the video reproducing apparatus 1 on the basis of the time information of the internal timer and the time code data from the video reproducing apparatus 1 so that the video reproducing apparatus 1 is operated in synchronism with the controller 4.

The time code data stored in the time code data buffer 9 are time code data representative of the in-point address and the out-point address similarly as described above. These two time code data are supplied to a time code data difference calculating unit 10.

The time code data difference calculating unit 10 obtains a difference between the time code data representative of the in-point address and the out-point address supplied thereto from the time code data buffer 9 by the calculation. The difference data thus calculated is supplied through a time code difference data buffer 11 to a control unit 12 from the time code data difference calculating unit 10.

The control unit 12 comprises a key frame data setting unit 13 and a motion control unit 14.

The key frame data setting unit 13 sets the difference data (time information) from the time code difference data buffer 11 as a time of a predetermined key frame (or duration (speed) of key frame). Also, the key frame data setting unit 13 sets various data corresponding to operation of the control panel 5. By way of example, positions through which pictures of every arbitrarily frames pass, i.e., frame points, etc. are set by the control panel 5.

The motion control unit 14 controls operation of the digital multi-effector on the basis of the key frame time or speed information that was set by the key frame data setting unit 13 or operation of the control panel 5.

The monitor receiver 2 is supplied with the video signal that was processed by the digital multi-effector to achieve a special visual effect or video signal from the video reproducing apparatus 1. This video signal is displayed on the display screen of the monitor receiver 2 as a picture that was processed to achieve a special visual effect.

Figure 2:
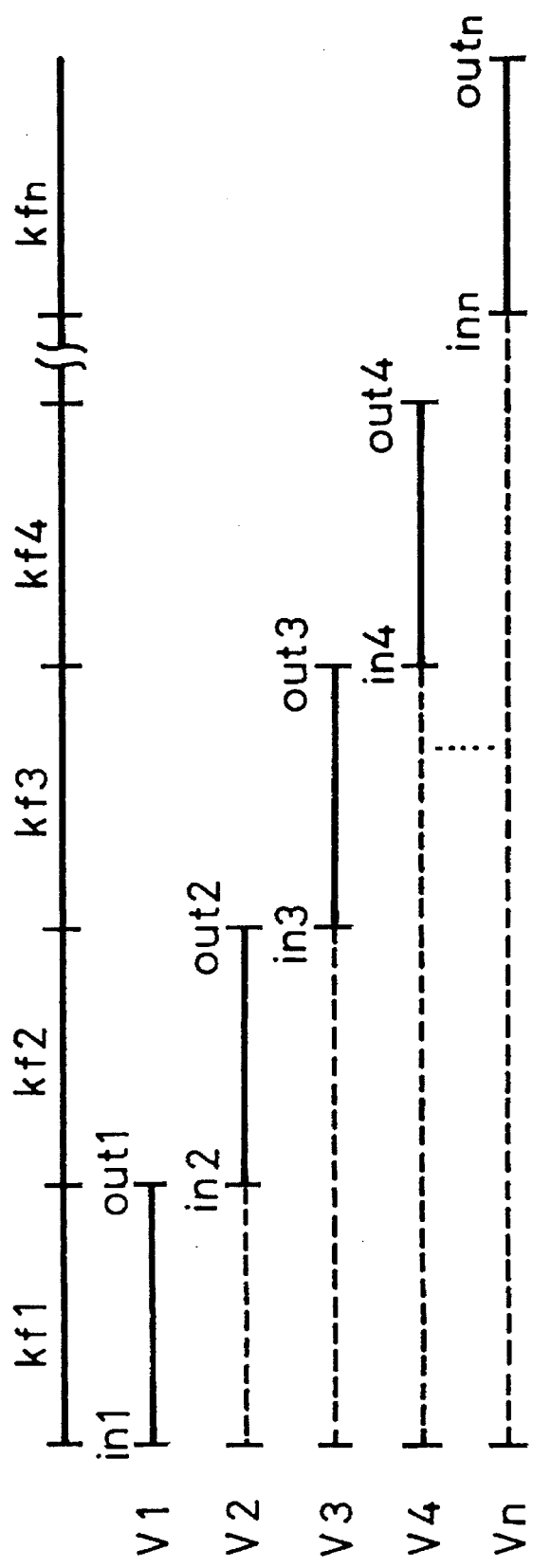
FIG. 2 is a diagram used to explain operation of the editing apparatus according to the embodiment of the present invention.
Figure 3A:
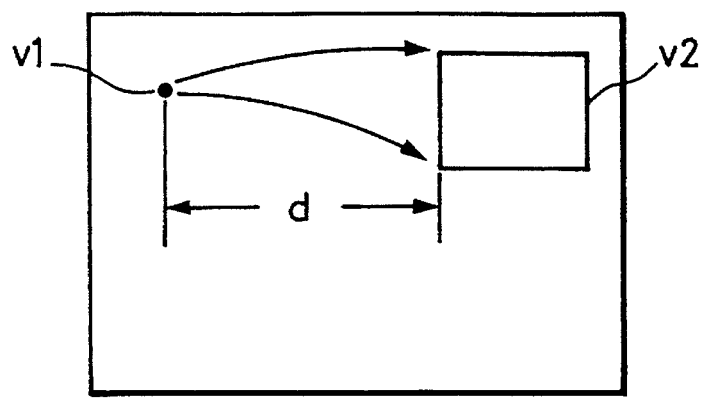
FIGS. 3A to 3D are schematic diagrams used to explain operation of the editing apparatus according to the embodiment of the present invention, respectively.
Figure 3B:
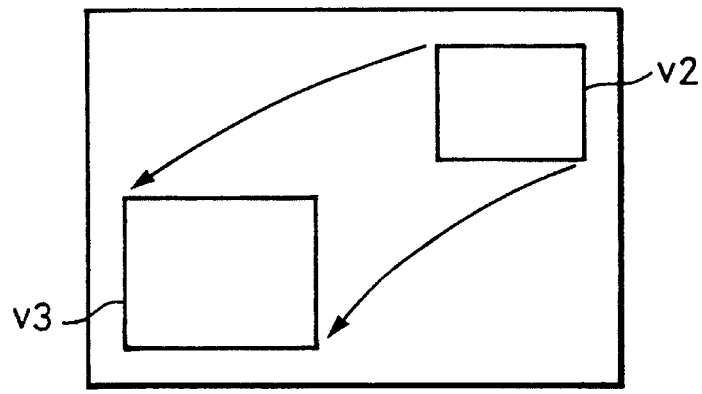
Figure 3C:
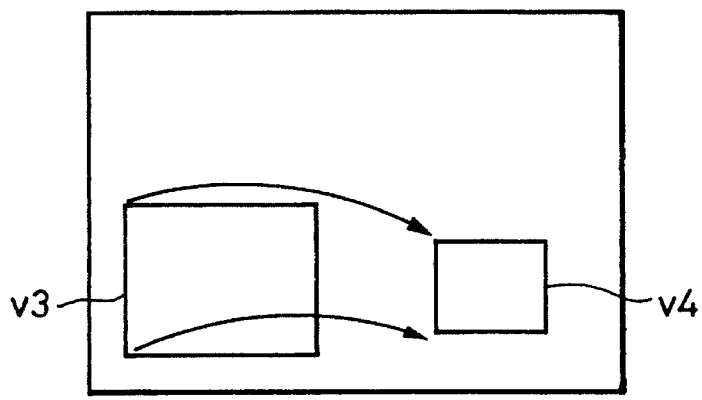
Figure 3D:
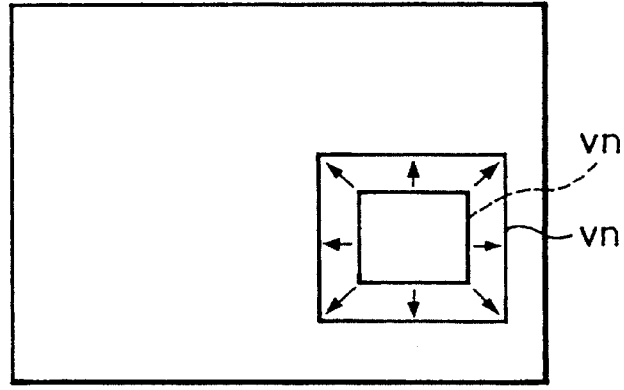

Referring to FIGS. 2 and 3, a description will be made of the case in which n VTRs are utilized as the video reproducing apparatus, for example, desired signals are selected from video signals recorded on the video tapes installed on these VTRs at every VTR and these selected video signals are processed to achieve a special visual effect by the digital multi-effector in the desired sequential order. In this embodiment, the video signals from the first VTR to the n'th VTR; are processed in sequential order to achieve a special visual effect.

An example of the special effect processing will be described hereupon. A reproduced picture v1 of a duration from the in-point address to the out-point address from the first VTR is moved while it is progressively enlarged in size and then changed to a reproduced picture v2 from the second VTR as shown by solid arrows in FIG. 3A. The reproduced picture of duration from the in-point address to the out-point address from the second VTR is moved while it is progressively enlarged in size and then changed to a reproduced picture v3 from the third VTR as shown by solid arrows in FIG. 3B. The reproduced picture v3 of a duration from the in-point address to the out-point address from the third VTR is moved while it is progressively reduced in size and then changed to a reproduced picture v4 from the fourth VTR as shown by solid arrows in FIG. 3C . . . and then reproduced picture vn of duration from the in-point address to the out-point address is progressively enlarged in size as shown by solid arrows in FIG. 3D.

Video signals recorded on the video tapes respectively installed on the n VTRs are designated as follows:

The first VTR, for example, is driven by operating a search button or the like on the control panel 5 of the controller 4. Then, a reproduced video signal from the first VTR is supplied to the monitor receiver 2.

The operator visually confirms the reproduced picture supplied to the monitor receiver 2 and searches a desired in-point address (edit-in) by operating a predetermined button or the like.

Then, the operator operates the control panel 5 of the controller 4, for example, at a desired in-point address in a series of operation such as the marking of time code data or the like to thereby read the time code data of the in-point address. The time code data at this in-point address is read out by the time code reading unit 7 in an earlier-noted manner and the time code data at this in-point address is supplied to the time code data buffer 9. A picture of a desired out-point address (edit-out) is searched in a similar manner.

The operator operates the control panel 5 of the controller 4, for example, at a desired out-point address in a series of operation such as the marking of time code data or the like to thereby read the time code data of the out-point address. Then, the time code data at this out-point address is read by the time code reading unit 7 in an earlier-noted manner and the time code data at this out-point address is supplied to the time code data buffer 9.

A time information (or speed information) representative of the difference between these in-point address and out-point address is calculated by the time code data difference calculating unit 10. The time information thus calculated is supplied to the key frame data setting unit 13 which determines the length of the allocated key frame.

The in-point address and the out-point address are set at each of the n VTRs, for example, and pictures from the n VTRs are sequentially allocated to the first through n'th key frames respectively. As shown in FIG. 2 of the accompanying drawings, if a picture designated by an in-point address in1 and an out-point address out1 from the first VTR is allocated to a first key frame kf1, then a time of the first key frame kf1 is determined; if a picture designated by an in-point address in2 and an out-point address out2 from a second VTR is allocated to a second key frame kf2, then a time of the second key frame kf2 is determined; if a picture designated by an in-point address in3 and an out-point address out3 from a third VTR is allocated to a third key frame kf3, then a time of the third key frame kf3 is determined; if a picture designated by an in-point address in4 and an out-point address out4 from a fourth VTR is allocated to a fourth key frame kf4, then a time of the fourth key frame kf4 is determined . . . ; and if a picture designated by an in-point address inn and an out-point address outn from an n'th VTR is allocated to an n'th key frame kfn, then a time of the n'th key frame is determined.

If a button such as an edit button or the like on the control panel 5 of the controller 4, for example, is depressed after the in-point address and the out-point address were designated at every VTR, then the motion control unit 8 in the controller 4 effects the cue-up control on the first to n'th VTRs, i.e., the motion control unit 8 allows the tapes of the respective VTRs to run and stop at the positions about 3 to 4 seconds before the respective in-point addresses.

When the stop positions of the tapes in the respective VTRs reach the positions about 3 to 4 seconds before the respective in-point addresses, a start button on the control panel 5 or the like, for example, is depressed. Then, the first VTR starts the playback and the reproduced video signal from the first VTR is supplied to the controller 4. Also, the time code data is read out.

Moreover, the first VTR is adjusted so as to operate in synchronism with the controller 4 by the motion control unit 8. When the picture reaches the in-point address under the condition that the playback servo is locked, the motion control unit 14 in the control unit 12 supplies a control signal to the digital multi-effector 3.

Then, as earlier noted in the example of FIG. 3, the reproduced video signal from the first VTR is processed to achieve a special visual effect during a playback of the duration from the in-point address to the out-point address and then output.

The playback operation in the second VTR is started 3 to 4 seconds before the playback of the video tape from the in-point address to the out-point address in the first VTR is finished under the control of the motion control unit 8 in the controller 4.

At that time, while the reproduced video signal from the first VTR is selected as the signal for the digital multi-effector 3 under the control of the motion control unit 14, the reproduced video signal from the second VTR is not selected.

Then, the motion control unit 8 controls the respective VTRs so that they may be operated in synchronism with the controller 4. Also, on the basis of the time code data of the first and second VTRs read out from the time code reading unit 7, the in-point address of the second VTR is reproduced after the playback of the out-point address of the first VTR is ended.

The reproducing operation in the first VTR is stopped under the control of the motion control unit 8 at the same time when the playback of the out-point address by the first VTR is ended. Simultaneously, the motion control unit 14 controls the digital multi-effector 3 so that the video signal from the first VTR is switched to the video signal from the second VTR.

Therefore, at the same time when the special visual effect processing on the reproduced video signal from the in-point address to the out-point address of the first VTR is finished, i.e., the first key frame kf1 is finished, the reproduced video signal from the in-point address to the out-point address of the second VTR starts to be processed to achieve a special visual effect.

Similarly, at the same time when the special visual effect processing on the reproduced video signal from the in-point address to the out-point address of the second VTR is finished, or the second key frame kf2 is finished, the reproduced video signal from the in-point address to the out-point address of the third VTR is started; at the same time when the special visual effect processing on the reproduced video signal from the in-point address to the out-point address of the third VTR is finished, or the third key frame kf3 is finished, the reproduced video signal from the in-point address to the out-point address of the fourth VTR starts to be processed to have a special visual effect; . . . and at the same time when the special visual effect processing on the reproduced video signal from the in-point address to the out-point address of a (n−1)'th VTR is finished, or (n−1)'th key frame is finished, the reproduced video signal from the in-point address to the out-point address of the n'th VTR starts to be processed to have a special visual effect.

As described above, according to this embodiment, since the time of a key frame serving as the unit of the special visual effect processing is automatically determined by designating the desired in-point address and out-point address of the video signal on the control panel, the operator can be released from the cumbersome work of calculating the key frame time and speed and entering the calculated result into the special effect apparatus. Therefore, the editing apparatus of the present invention becomes easy to handle. Also, a mistake, by the operator such as a mistake in the calculation or the like can be eliminated. Hence, editing work of high accuracy can be carried out.

While the video signal is processed to achieve such a special visual effect as to move a real moving picture by using the VTRs, the present invention is not limited thereto and can be applied to an editing apparatus using a reproducing apparatus that employs the optical disc, the hard disc and the image memory as the recording medium. Furthermore, the special visual effect processing can be applied to a wide variety of special visual effect processing.

As set forth, according to the present invention, since the key frame time or speed is calculated by the special visual effect apparatus; from the difference between the time code data representative of the in-point address and the time code data representative of the out-point address set in the video reproducing apparatus the cumbersome work by the operator of calculating the key frame time or speed and entering the calculated result into the special visual effect apparatus is not needed. Therefore, the editing apparatus of the present invention becomes easy to handle. Also, a mistake by the operator such as a mistake in calculation or the like can be eliminated. Hence, editing work of high accuracy can be carried out.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An editing apparatus for editing a video signal, said apparatus comprising:

reproducing means for reproducing said video signal and address data recorded on each of a plurality of recording media;

first controlling means for controlling a reproducing operation of said reproducing means;

selecting means for selecting an in-point address and an out-point address for each of said recording media upon actuation by a user of the apparatus;

reading means responsive to said reproducing means and said selecting means for reading first and second address data obtained from said reproducing means corresponding to said in-point address and said out-point address, respectively, for each of said recording media;

first buffer means responsive to said reading means for storing said first and second address data for each of said recording media;

a subtracter separate from and responsive to said first buffer means or producing a difference between said first and second address data for each of said recording media;

second buffer means separate from and responsive to said subtracter for storing said difference obtained from said subtracter for each of said recording media;

setting means responsive to said second buffer means for automatically setting key frame information on the basis of said difference for each of said recording media;

processing means for processing said video signal provided from said reproducing means to achieve a visual effect; and second controlling means for controlling an editing operation of said processing means in response to said information of each of said key frames by automatically (a) effecting que-up of each of said recording media, (b) starting and stopping each of said recording media, and (c) reproducing from each of said recording media between said respective in-point and out-point addresses;

said second controlling means being operative so that, when reproducing of said video signal of a given one of said recording media is completed, reproducing of said video signal of a succeeding one of said recording media commences immediately.

2. The editing apparatus to claim 1, further comprising means for monitoring said video signal provided from said reproducing means or said video signal provided by said processing means.

3. The editing apparatus according to claim 1, wherein said means for selecting comprises control panel means for actuation by the user and for effecting a variety of control operations in connection with said first controlling means or said second controlling means.

4. The editing apparatus according to claim 1, wherein said reproducing means consists of one of an image reproducing apparatus which reproduces a hard disc, an optical disc, and an image memory capable of producing a real moving picture.

5. The editing apparatus according to claim 1, wherein said reproducing means is a video tape recorder.

6. The editing apparatus according to claim 1, wherein said processing means is a digital multi-effector for achieving a visual effect.

7. The editing apparatus according to claim 1, wherein said first buffer means is a time code data buffer.

8. The editing apparatus according to claim 1, wherein said second buffer means is a time code difference data buffer.

* * * * *

UNITED STATES PATENT AND TRADEMARK OFFICE
CERTIFICATE OF CORRECTION

PATENT NO. : 5,621,536
DATED : April 15, 1997
INVENTOR(S) : Sojiro Kizu

It is certified that error appears in the above-identified patent and that said Letters Patent is hereby corrected as shown below:

Col.2, line 18, after "VTR" change "," to --.--
Col.5, line 18, after "VTR" second occurrence, delete ";"
Col.6, line 8, after "frames" insert --,--
Col.7, line 57, delete ";"

<u>In the claims</u>:
Col. 8, line 57, after "apparatus" insert --according--

Signed and Sealed this

Fifteenth Day of September, 1998

Attest:

BRUCE LEHMAN

Attesting Officer        Commissioner of Patents and Trademarks